Aug. 13, 1929.  E. H. FORD  1,724,873
MAGNETIC METER
Filed Sept. 6, 1927   2 Sheets-Sheet 2
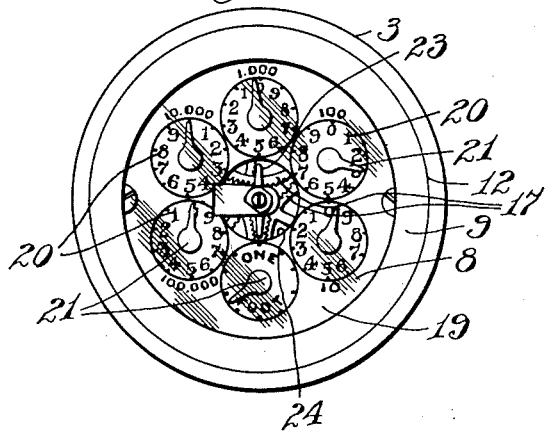
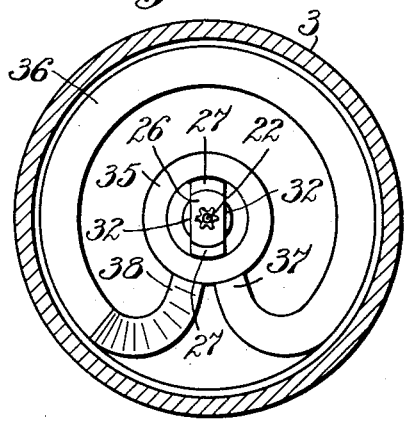
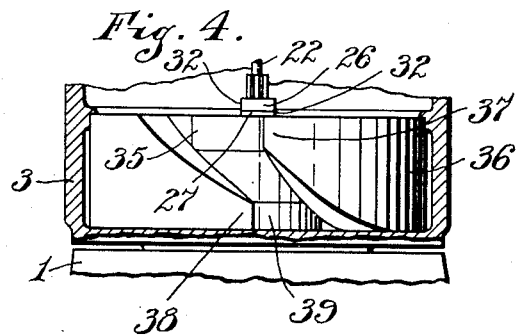
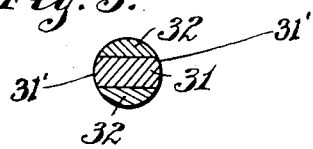
INVENTOR
*Edwin H. Ford,*
BY
*Hood & Hahn*
ATTORNEYS Patented Aug. 13, 1929.

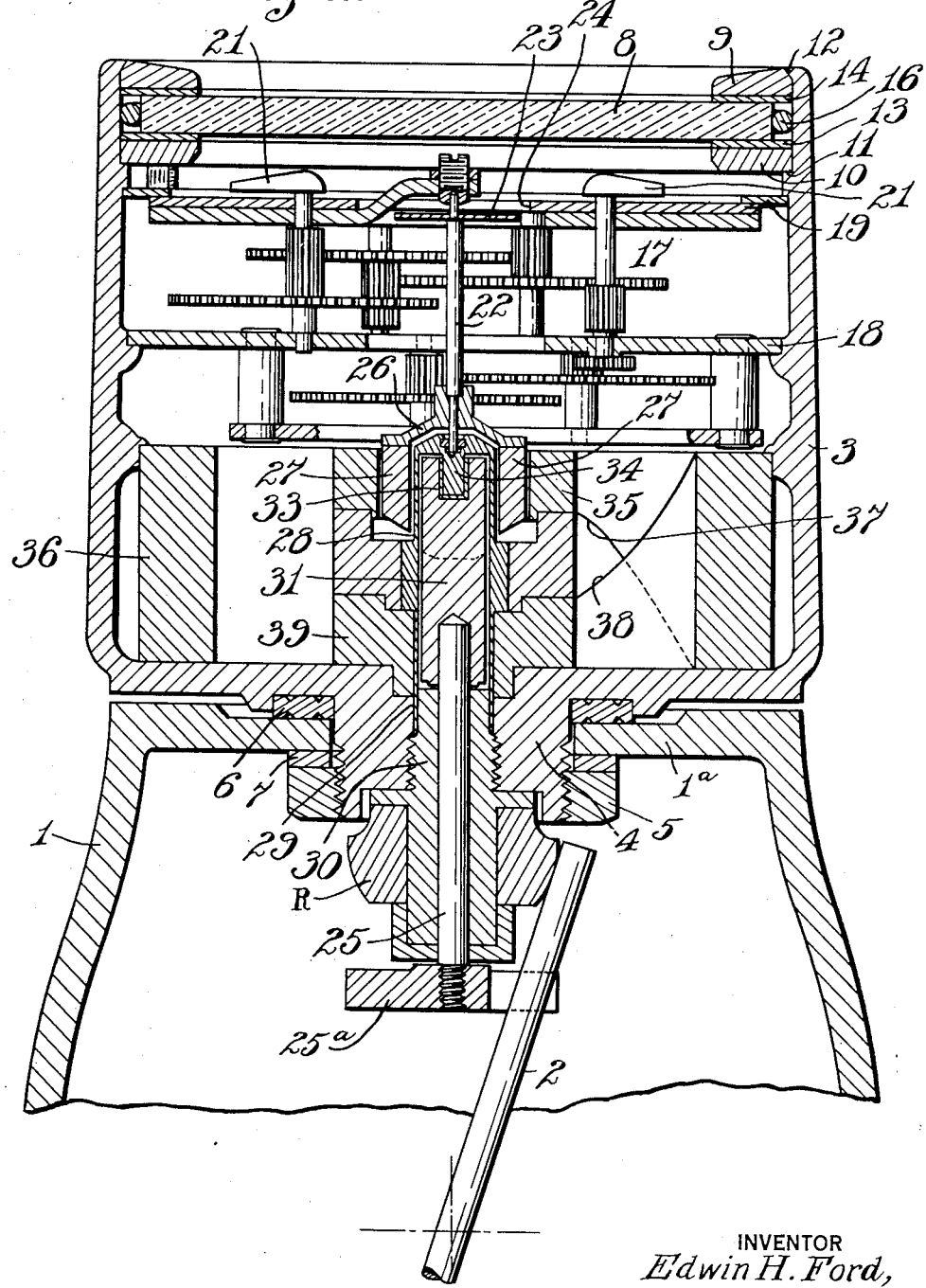

1,724,873

UNITED STATES PATENT OFFICE.

EDWIN H. FORD, OF WABASH, INDIANA, ASSIGNOR TO FORD METER BOX COMPANY, OF WABASH, INDIANA, A CORPORATION OF INDIANA.

MAGNETIC METER.

Application filed September 6, 1927. Serial No. 217,551.

My invention relates primarily to improvements in small capacity (house) water meters and has, for its general object, the production of a metering mechanism, with the limits of size which have been found most practical in such meters now commonly in use, of such character as to operate accurately through long periods of time and under a minimum differential.

In water meters, if the gears, shafts and bearings, which form the registering mechanism, or the intermediate driving train, are so arranged that the water may have access thereto, it is impractical to provide accurate bearings for the shafts; the gears must be loosely fitted; the bearings and gears become fouled in course of time; the glass plate, through which the readings are made, becomes opaqued by fouling or temporarily translucent by fogging because of temperature changes; lubrication when used must be fairly heavy in order to withstand the water for a reasonable time and even such lubrication must be often renewed; and the registering mechanism must be made sturdier and less sensitive and accurate than is desirable purely from a metering view point. Any mechanical connection between the water-impelled element and the registering mechanism necessarily involves either all of the above-mentioned undesirable characteristics and a packing-gland between the water-impelled element and the registering train, and the introduction of a packing-gland itself produces equally undesirable characteristics because the gland requires frequent inspections, adjustments and renewals in order to insure expected operation and in all cases introduces an element of friction which increases the differential under which the apparatus will function, thereby decreasing its accuracy and sensitiveness.

In apparatus, of the character mentioned, the water impelled element moves much more rapidly than any visible element of the registering mechanism and it has long been the custom to divide the registering train into two parts, the first of which is mechanically connected with the water-impelled element of the meter and is within the water chamber, and the second of which is protected from the water by means of a packing gland surrounding a shaft which mechanically connects the two portions of the registering train. As a consequence of this construction no portion of the registering train, which could satisfactorily be made visible, moves with a speed sufficient to be readily noted and it is impossible, by ordinary methods, and without expenditure of much time, to inspect such meters in place to determine whether or not they are accurately metering the actual water flow. It is customary, therefore, for operating companies, to periodically withdraw meters from service and test them in the laboratory, such withdrawals involving the substitution of other tested meters and an expenditure of considerable sums for labor. The periodical testing forms a very considerable item of operating expense.

The object of my invention is, therefore, to provide a water meter suitable for accurately metering water to average, and the great majority of, consumers, which shall have the following characteristics:—it need be no larger nor more costly than meters now commonly in use for the same service; it may be readily so made as to operate under a lower differential than has been heretofore found to be commercially practicable and will therefore be much more sensitive and accurate; the entire metering train will be isolated from the water chamber of the meter but will be accurately driven by the water-impelled element thereof without slippage and without frictional resistance so far as the isolation from the water is concerned; it will have its registering elements so isolated from the water chamber of the meter that their frictional resistance may be practically reduced to a minimum, the lightest lubrication maintained indefinitely, and the glass will never become clouded; its construction will be such that an element of the registering mechanism moving at a comparatively high rate of speed—such for instance as the speed of the water impelled element—will be readily visible, so that its operativeness and accuracy may be readily tested in place, and its construction be such as to be much more accurate and less costly of maintenance and operation than has heretofore been found to be commercially practicable.

Advantages other than those stated above will become apparent.

For the purpose of disclosing my invention I have illustrated one embodiment thereof in the accompanying drawings in which—

Fig. 1 is a vertical sectional view of the registering train and delivery end of the water-impelled element of a water meter embodying my invention;

Fig. 2 is a plan view, on a smaller scale, of the registering end thereof;

Fig. 3 is a transverse section, in the scale of Fig. 2, showing more particularly a desirable shape of the permanent magnet;

Fig. 4 is a detail vertical section, on the scale of Figs. 2 and 3, illustrating the configuration of the permanent magnet; and Fig. 5 is a transverse section, on the scale of Fig. 1, of the element 31.

In the embodiment illustrated the casing 1 contains any usual water metering apparatus (preferably omitting all reduction gearing) of which the element 2 is the water-impelled element adapted to be rotated by the moving water and to operate the registering mechanism.

The casing 1 is provided with an upper wall 1ª on which is mounted a preferably cylindrical casing 3 adapted to contain the registering mechanism and associated parts. The casing 3 is provided at its lower end with a neck 4 adapted to fit in an opening in the upper wall 1ª and provided with external threads arranged to receive the threaded collar 5. A packing washer 6 is interposed between the bottom wall of the casing 3 and the upper face of the wall 1ª, and a second washer 7 is interposed between the ring 5 and the under face of the wall 1ª so that when the ring 5 is drawn up on the threaded neck 4 the two casings will be securely clamped together and a water tight joint formed at the junction. This joint, however, permits a rotation of the casing 3 relatively to the casing 1, when desired, so that the registering elements may be conveniently positioned for ready reading.

The top of the casing 3 is closed by a glass cover 8 which is preferably formed of unbreakable or "bullet proof" glass. The glass is sealed in position between a pair of sealing rings 9 and 10, the ring 10 resting on an annular shoulder 11 formed on the inner face of the wall of the casing and the ring 9 being clamped in position by spinning or swaging over the wall of the casing as at 12. Interposed between the rings and glass are packing washers 13 and 14 and surrounding the periphery of the glass is a packing washer 16. By this construction the top of the casing is hermetically sealed against moisture, dust and foreign particles and the registering mechanism is protected.

The gear train 17 is preferably the entire reduction train of the registering mechanism and is supported within the casing 3 beneath the glass cover and by supporting discs 18 and 19. The disc 19 on its upper face is provided with the usual dials 20 with which co-operate the indicating hands 21 driven from the gear train, which train in turn is driven from a shaft 22 having at its upper end an indicator hand 23 visible through an opening 24 in the disc 19.

The practically frictionless driving connection between the meter and register is as follows:—The neck 4 is bored and threaded to receive a bushing 30 in which is loosely journaled a shaft 25 provided at its lower end with a head 25ª comprising a cross arm with which element 2 engages in the usual manner, the upper end of said element engaging, as usual, a roller R journaled on the bushing 30. Secured to the upper end of the shaft 25 is the magnetic element 31 which forms the driving element of a magnetic coupling between the water-impelled element and the registering train of the meter. The upper portion of element 31 is preferably a diametrical section of a cylinder having arc-shaped ends 31', 31' (which for convenience will be called circumferential ends) which is completed by two flanking non-magnetic sections 32 which, though not essential, are desirable in view of the small clearances which will be maintained. The upper end of element 31 is axially bored to receive a bushing 33 in which is received the stud 34 which is axially carried within the bore of a closed-top preferably non-magnetic tube 28 which is sleeved over element 31 and has its lower open end sealed in the upper end of the bore 29 of neck 4. This sealing may be accomplished by soldering, by a water-tight pressed fit, or otherwise, but preferably in such manner that the bushing 30, with shaft 25 and element 31—32 may be readily withdrawn. The stud 34 forms a bearing for the upper end of the element 31. Sleeved over the upper end of the tube 28, preferably with as little clearance as possible to permit free rotation, are the circumferentially separated magnetic fingers 27 of the driven element 26 of the magnetic coupling. There are as many fingers 27 as there are circumferential ends of element 31 and they are similarly circumferentially spaced and of substantially the same circumferential extent.

The fingers 27 of the driven member of the magnetic clutch are surrounded by a magnetic equalizing ring 35 which is radially spaced from these projections by a small air gap. The ring 35 is in contact with one of the poles of a permanent magnet 36. This magnet is preferably circular in form and has its polar ends tapered and turned inwardly as at 37 and 38, the inturned end 37 contacting with the equalizing ring 35 and the inturned end 38 contacting with a second equalizing ring 39 lying in a plane below the plane of ring 35 and surrounding the lower end of the element 31 but outside of the tube 28. By this arrangement the driving and driven members of the magnetic coupling are under the influence of the magnetic flux of the permanent magnet, the lines of force passing from one pole, say the lower pole, through the driving member 31 and thence back through the driven member 27—26 to the upper pole of the permanent magnet so that when rotative movement imparted to the driving member through the operation of the shaft 25 will immediately cause the rotation of the driven member and through the shaft 22 will drive the gear train of the register of the meter.

It is apparent that, due to the provision of the non-magnetic closed-ended tube 28, the casing 3 is sealed against the ingress of any water which may seep through the bearing for the shaft 25. I am thus enabled to seal the casing 3 without the use of packing glands or stuffing boxes which create a drag on the gear train and prevent accurate and sensitive registration of the water below.

If desired, the tube 28 may contain a lubricant of such character that it will be retained by the water pressure entering around the shaft 25.

The permanent magnet 36 may be of any desired form and may be in one or more sections. I have found in practice, however, that the form of single magnet shown in the drawings seems most effective. This magnet should be so proportioned and placed relative to element 31 that said element will be practically balanced and suspended in the magnetic flux thus eliminating friction due to the weight of this part. It will be noted that the permanent magnet 36 is a stationary element of the structure and that, because of the isolation and perfect lubrication of the registering train, said train will offer but slight resistance to movement. The magnet 36 may therefore be made relatively heavy and strong as compared with the space available for its reception, and the coupling elements 31 and 27 may be made relatively light and consequently without appreciable magnetic lag or inertia overthrow. As a consequence, element 2 will be free to respond to minute water flow and the light magnetic coupling under a relatively heavy magnetic flux, will instantly respond in starting, moving and stopping, and thus accurately and sensitively actuate the register.

In the form of apparatus shown in the drawings the element 22—23 of the register moves at the same speed as the water impelled element 2 and this movement is visible even upon the most casual inspection. It is apparent, therefore, that my meter may be readily tested for both operability and accuracy, without removal from the service line. Inspection of the meter in service, with all outlets supposedly closed, will immediately disclose the existence of any leaks and, by withdrawal of a small measured quantity of water and noting the corresponding movement of finger 23, the accuracy of the meter may be readily and promptly determined. This is an important characteristic of my meter by which its commercial use may be continuously maintained at much less expense than meters lacking such characteristics.

The fingers 27 of element 26 and the circumferentially separated ends 31' of the diametrical section of element 31 have a common characteristic in that they are circumferentially separated portions of magnetic material through which magnetic flux may be established when the fingers 27 are angularly coordinated with the ends 31'. These elements thus become, in effect, magnetic extensions of the poles of the magnet and therefore, for the sake of brevity in the claims, I shall refer to these elements 27 and portions 31' as poles.

I claim as my invention:

1. The combination with a water meter having a chamber through which the water passes and an impeller in said chamber, of a register casing having a register mechanism mounted therein, and a driving connection between said impeller and register mechanism comprising a magnetic rotary element having poles and driven from said impeller, a sealing envelope surrounding said element and sealing the register casing against ingress of water thereto from the impeller chamber, a second magnetic rotary element having poles overlapping said first element and mounted externally of said envelope and drivingly connected with the registering mechanism, and a stationary permanent magnet arranged in said register casing and having its poles so disposed as to have said rotary elements within the magnetic circuit thereof.

2. The combination with a water meter having a chamber through which the water passes, and an impeller in said chamber, of a register casing having a register mechanism mounted therein, a top closure for said casing including a glass cover hermetically sealing the top of said casing, a sealing envelope sealing the bottom of the casing and having a chamber communicating with the impeller chamber, a magnetic rotor having poles arranged within said envelope and driven from said impeller, a second magnetic rotor drivingly connected with the register mechanism and having poles overlapping said first rotor, and a stationary permanent magnet mounted in said register casing and having its poles so disposed as to have the rotors within the magnetic circuit thereof.

3. The combination with a water meter having a chamber through which the fluid passes and an impeller in said chamber, of a register casing having a registering mechanism mounted therein, and a driving connection between said impeller and registering mechanism comprising a magnetic element having poles driven from said impeller, a sealing envelope surrounding said element and sealing the register casing against the ingress of water thereto from the impeller chamber, a second magnetic rotary element having poles overlapping said first element and mounted outside of said envelope and drivingly connected with the registering mechanism, and a stationary permanent magnet arranged in said register casing having annular poles surrounding said rotary elements and so disposed as to have said rotary elements within the magnetic circuit of the magnet.

4. The combination with a water meter having a chamber through which the water passes, an impeller arranged within said chamber, a register casing and registering mechanism mounted within said casing, and a driving connection between said impeller and said registering mechanism including a stationary permanent magnet and a rotary keeper therefor, said keeper comprising two rotary elements, one associated with one pole and projecting toward the other and the other associated with the second pole and projecting toward the first, the two rotors overlapping and connected respectively to the impeller and register mechanism, and an envelope arranged between said two rotors, enclosing one of said rotors and sealing the casing against the ingress of water from the meter.

5. In combination in a water meter, a measuring chamber through which the water passes, an impeller arranged in said chamber to function through cycles of movement, a gear train comprising reducing gears and the usual series of indicators and also comprising an indicator movable at a speed high relative to the usual metering indicators and comparable to the speed of the impeller of the meter, a driving coupling between the impeller and gear train, said coupling comprising two rotary co-operating magnetic elements, an envelope which encloses one of said magnetic elements and forms a seal between the impeller chamber and the registering train, and a stationary permanent magnet having its poles arranged to include the said two rotary magnetic elements in its magnetic circuit.

6. In a water meter, a water measuring chamber, an impeller therein, a casing, a registering gear train mounted within said casing and having the usual metering indicators, a tube forming a water seal between the measuring chamber and the register casing, a magnetic rotor journalled within the tube and provided with a portion actuated by the impeller, a second magnetic rotor sleeved over the tube and first rotor and connected to the registering train, and a stationary permanent magnet having its poles arranged to include the two rotors in its magnetic circuit.

7. In a water meter, a water measuring chamber, an impeller therein, a casing, a registering gear train mounted within said casing and having the usual metering indicators and an additional high speed indicator movable at a readily visible speed not less than the speed of the impeller, a tube forming a water seal between the measuring chamber and the register casing, a magnetic rotor journalled within the tube and provided with a portion actuated by the impeller, a second magnetic rotor sleeved over the tube and first rotor and connected to the registering train, and a stationary permanent magnet having its poles arranged to include the two rotors in its magnetic circuit.

8. In a water meter, a water measuring chamber, an impeller therein, a casing, a registering gear train mounted within said casing and having the usual metering indicators, a tube forming a water seal between the measuring chamber and the register casing, a magnetic rotor journalled within the tube and provided with a portion actuated by the impeller, a second magnetic rotor sleeved over the tube and first rotor and connected to the registering train, and a stationary permanent magnet having its poles arranged to include the two rotors in its magnetic circuit, said poles having annular portions, one encircling each rotor.

9. In a water meter, a water measuring chamber, an impeller therein, a casing, a registering gear train mounted within said casing and having the usual metering indicators and an additional high speed indicator movable at a readily visible speed not less than the speed of the impeller, a tube forming a water seal between the measuring chamber and the register casing, a magnetic rotor journalled within the tube and provided with a portion actuated by the impeller, a second magnetic rotor sleeved over the tube and first rotor and connected to the registering train, and a stationary permanent magnet having its poles arranged to include the two rotors in its magnetic circuit, said poles having annular portions, one encircling each rotor.

10. In a water meter, the combination with a casing through which the water may flow, a displacement member mounted in said casing and actuated by the flow of water therethrough, an element of magnetic material directly connected with said displacement member, movable in unison therewith, a second element of magnetic material arranged in cooperative relation with the first mentioned element of magnetic material so as to move in unison therewith and isolated from the water chamber, stationary means for directing a magnetic field through said two elements of magnetic material, a counter train comprising a series of reducing gearing one element of which is carried by the second element of magnetic material, a series of indicators driven by said reducing gearing, and an indicator connected to the second element of magnetic material, said indicators being visible from the exterior of the device.

11. In a water meter, the combination with a casing through which the water may flow, a displacement member mounted in said casing and actuated by the flow of water therethrough, an element of magnetic material directly connected with said displacement member, movable in unison therewith, and mounted within the water chamber, a second element of magnetic material arranged in cooperative relation with the first mentioned element of magnetic material so as to move in unison therewith and isolated from the water chamber, stationary means for directing a magnetic field through said elements of magnetic material, a counter train comprising a series of reducing gearing one element of which is carried by the second element of magnetic material, a series of indicators driven by said reducing gearing, and an indicator connected to the second element of magnetic material, said indicators being visible from the exterior of the device.

12. A water meter comprising a casing through which the water may flow, a rotary displacement member rotatably mounted in said casing and rotatable by movement of water through the casing, an element of magnetic material carried by and rotatable with the displacement member, a second element of magnetic material rotatably mounted outside of the casing in cooperative relation with the first mentioned element of magnetic material and isolated from the water chamber, a strong stationary permanent magnet isolated from the water chamber and arranged with the two rotary elements of magnetic material in its magnetic field, an indicator carried by said second element of magnetic material and moving in unison therewith, a reducing train isolated from the water chamber and geared to the second element of magnetic material, and indicators driven by said reducing train, the several indicators being visible from the exterior of the casing.

In witness whereof, I, EDWIN H. FORD, have hereunto set my hand at Wabash, Indiana, this 2nd day of Sep., A. D. one thousand nine hundred and twenty-seven.

EDWIN H. FORD.